March 10, 1970 K. NELSON 3,499,422
AUTOMATED MILKING SYSTEM
Filed Feb. 21, 1968 5 Sheets-Sheet 1

INVENTOR
KURT NELSON
BY
Davis, Hoxie, Faithfull & Hapgood
ATTORNEYS

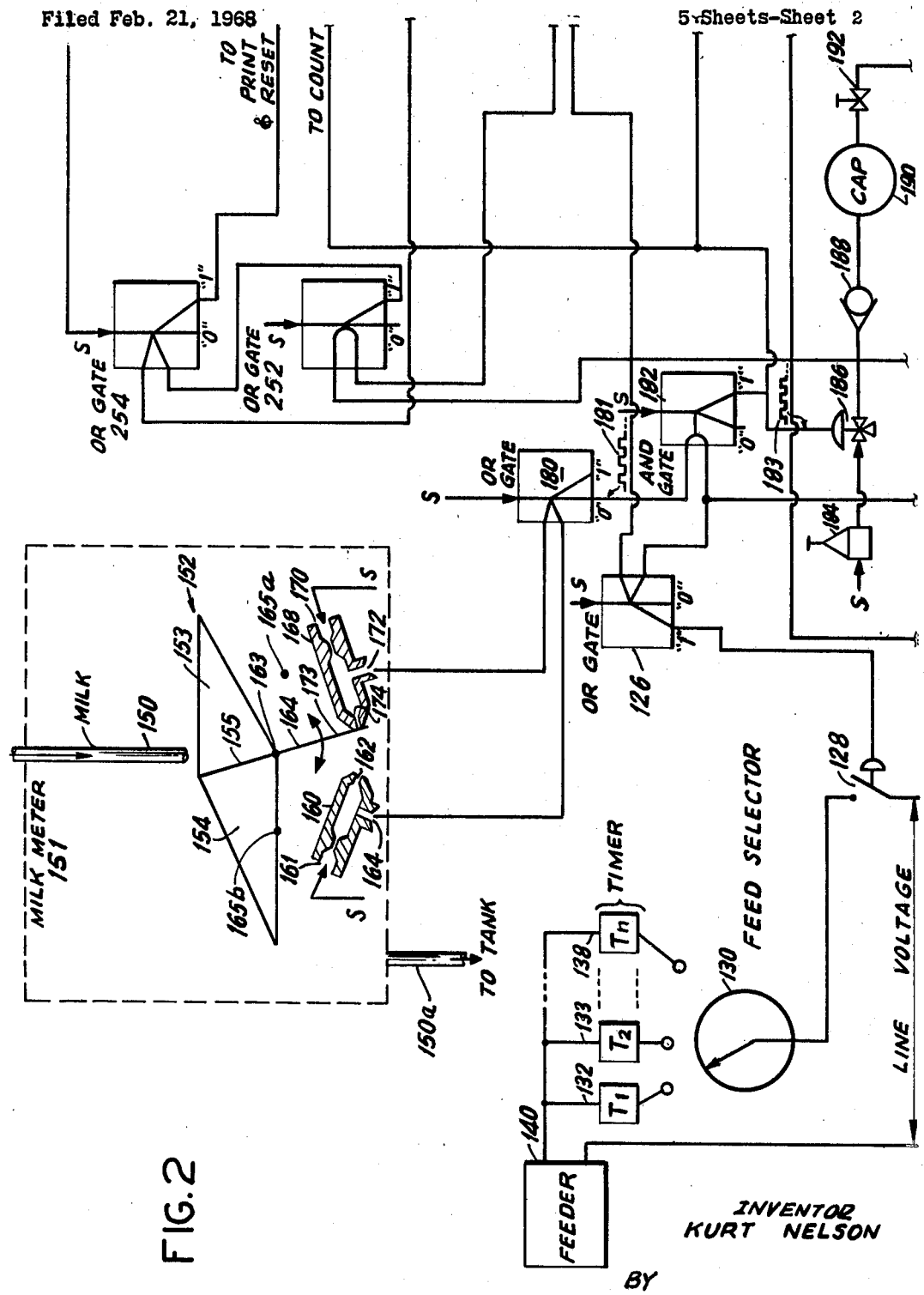

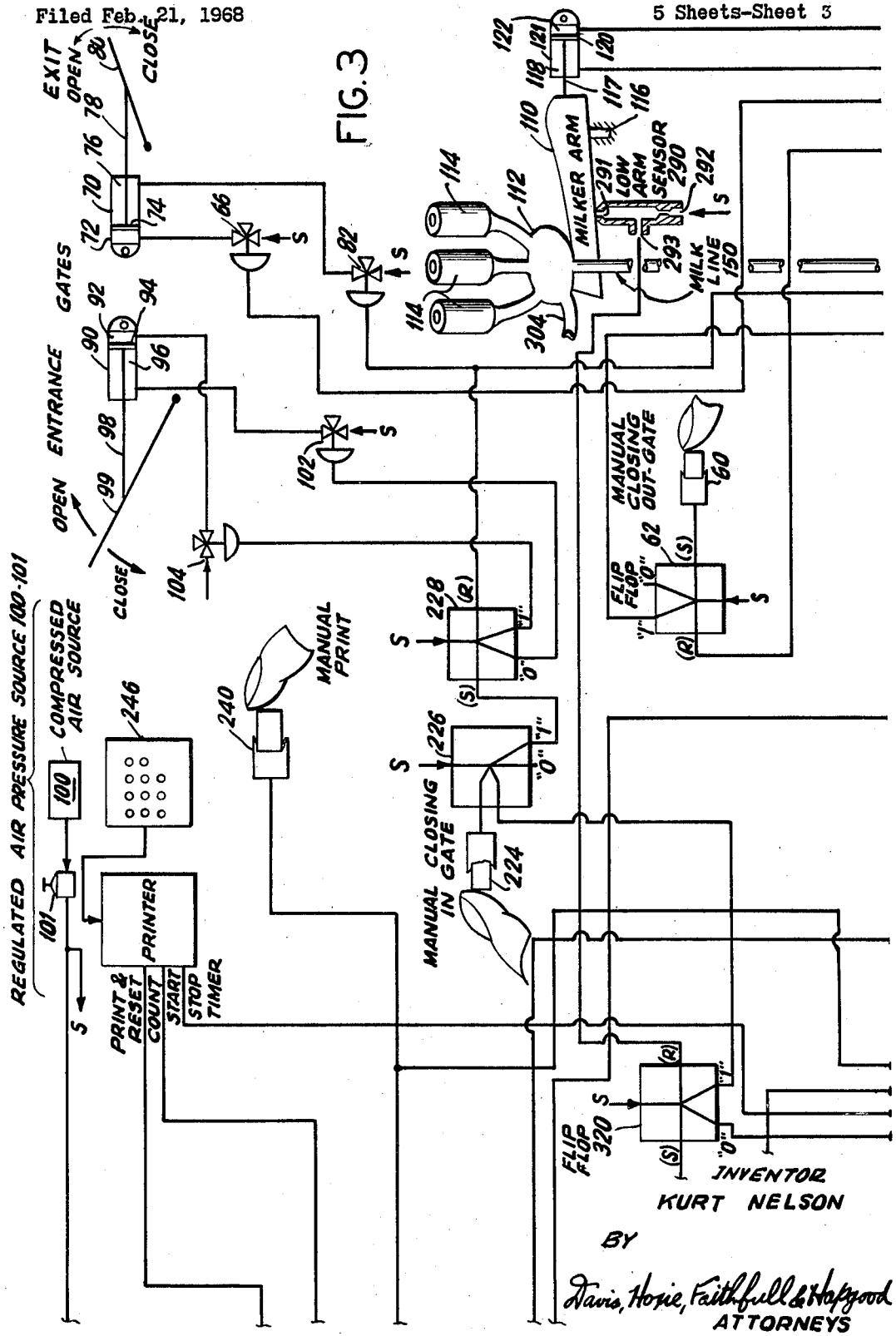

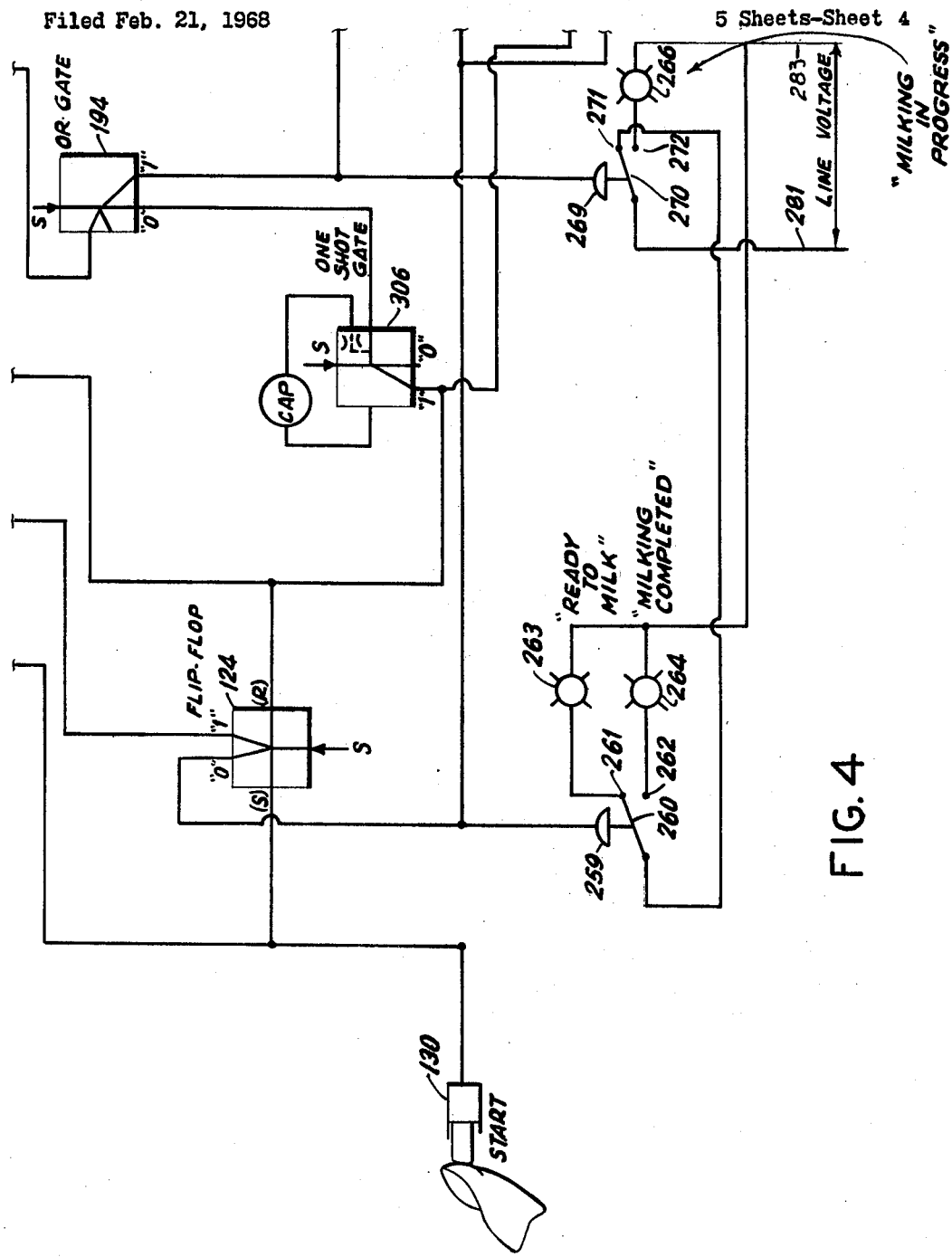

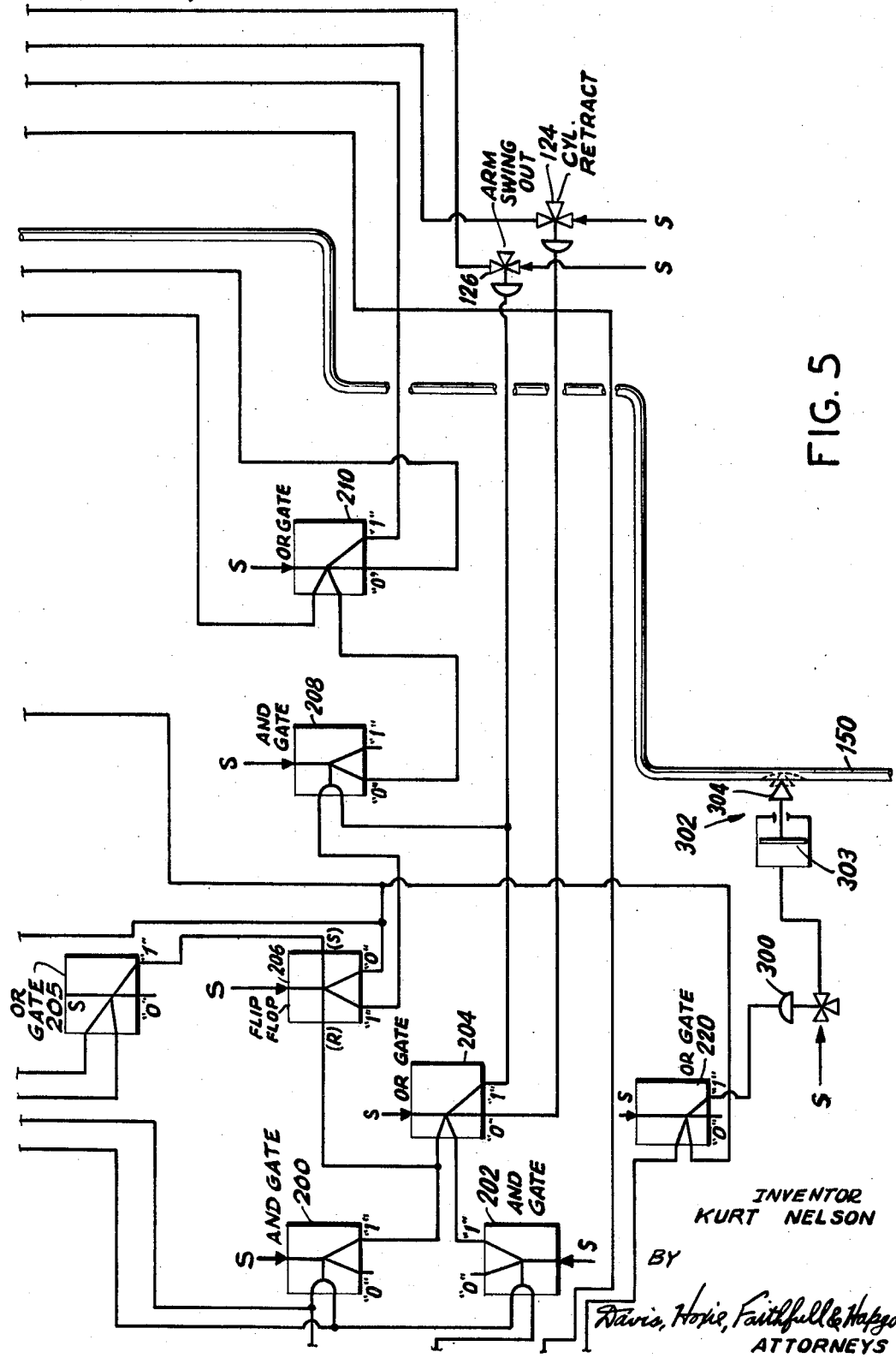

3,499,422
AUTOMATED MILKING SYSTEM
Kurt Nelson, Wappingers Falls, N.Y., assignor to The
De Laval Separator Company, Poughkeepsie, N.Y., a
corporation of New Jersey
Filed Feb. 21, 1968, Ser. No. 707,230
Int. Cl. A01d 5/00
U.S. Cl. 119—14.08                                    21 Claims

ABSTRACT OF THE DISCLOSURE

An automated milking system employs a reciprocating tilt table milk metering unit and fluidic logic apparatus to effect a plurality of supervisory milking functions, and to determine the completion of a milking operation. The logic apparatus is responsive to the table reciprocating at less than a threshold rate for automatically separating the milking structure from the cow, and for opening exit and entrance gates at the milking station to initiate a succeeding milking operation.

---

Figure 1A:
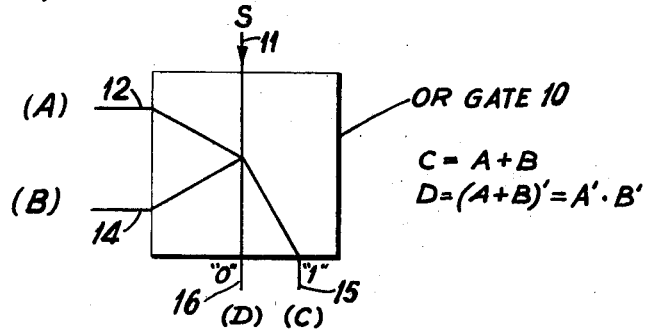

This invention relates to milking apparatus and, more specifically, to a system arrangement for automatically effecting the requisite supervisory and control functions for a milking station.

Milking systems in common use comprise a plurality of milker units each having a set of vacuum actuated teat cups, a vacuum pulsator for operating the teat cups via a milking claw, and a receiver into which milk from the teat cups is delivered. During milking, the milker units are connected to a common vacuum pipe line for placing the respective receivers under vacuum and for applying vacuum intermittently to the teat cups under control of the respective pulsators. In many systems, the milker units are also connected to a common milk pipe line or bulk tank, also placed under vacuum, for withdrawing milk from the respective receivers after recording the milk weight.

General practice in the use of such systems is for dairy personnel to transfer the teat cups of each milker unit from one cow to another until an entire herd has been milked. However, a major obstacle to efficient use of the system has been the difficulty in determining when the milking of each cow has been completed, as this determination usually requires inspections of each of the various units from time to time during each of its operations. Unless the teat cups of each unit are transferred quite promptly to another cow upon completion of a milking operation and emptying of the receiver, the time required to milk the herd is prolonged; and excessive delay in removing the teat cups from a fully milked cow may be injurious to her. Such prior art milking systems have therefore typically required a relatively great amount of human supervision and control.

It is therefore an object of the present invention to provide an improved milking system.

More specifically, an object of the present invention is the provision of a system for automatically supervising a milking operation, and for removing the milking claw and teat cups after the operation terminates.

It is another object of the present invention to provide an automatic milking system which includes accurate and reliable apparatus for sensing when a milking unit has completed a milking operation, and for automatically freeing the animal and recording her milk output upon completion of milking.

These and other objects of the present invention are realized in a specific, illustrative automated milking system employing digital fluidic logic control. A plurality of cows are secured within a corresponding plurality of milking stations, and vacuum actuated milking teat cups are applied thereto.

The milk from each cow flows into one of two contiguous chambers of a reciprocating tilt table device. When the chamber fills, the table rotates to an alternate stable position thereby discharging the filled chamber into a milk receiving tank, while the other chamber is filled. Each time the milk receiving table tilts, a fluidic timing circuit is energized. When the rate of reciprocation of the table falls below a predetermined minimum threshold value, indicating that the cow is fully milked, a storage element in a timing circuit becomes fully discharged. Responsive thereto, the milking vacuum is broken; an arm containing the teat cups and milking claw separates from the animal and rotates to a rest position at one side of the milking station; an exit gate is opened to permit the cow to leave the station; and an entrance gate is opened allowing the next animal to enter.

Should the milking arm with its attendant apparatus inadvertently drop from the animal before milking is completed, an attendant may, at his discretion, resume the milking process which will automatically terminate when the milk supply is exhausted. Upon such an improper separation, the animal's feed supply is continuously maintained without interruption and only the proper quantum of feed is deposited in a feeding trough.

Figure 6:
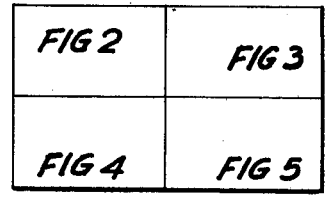

A complete understanding of the present invention and of the above and other objects, features and advantages thereof may be gained from a consideration of the following detailed description of an illustrative embodiment thereof presented hereinbelow in conjunction with the accompanying drawing, in which:

FIGURES 1A through 1D schematically depict a plurality of fluidic structures employed in the automated milking system of FIGS. 2 through 5;

FIGURES 2 through 5 depict an automated milking system which illustratively embodies the principles of the present invention; and FIGURE 6 depicts the spacial organization of FIGS. 2 through 5.

Referring now to FIGS. 2–5 arranged in accordance with FIG. 6, there is shown an automated milking system employing fluidic logic control. For each fluidic structure employed therein, power (air pressure) is furnished by a compressed air source 100 which cooperates with a pressure regulating unit 101 of any conventional type for supplying a constant output pressure, e.g., 3 p.s.i. Throughout the drawing, each line from the source and regulator 100 and 101 to any gate, and the lines between any two gates, symbolizes closed conduits, such as plastic tubing, for the passage of compressed air unless otherwise indicated.

The particular gate structures included in the automated milking system of FIGURES 2–5 are depicted in FIGS. 1A through 1D. FIGURE 1A illustrates an OR logic gate 10 having a "power" input port 11 connected to the 3 p.s.i. compressed air source 100–101. The gate 10 includes two air input ports 12 and 14 which, for purposes of illustration, are respectively assigned two input digital variables A and B, with the requisite two digital states being identified by the presence or absence of a compressed air input. Finally, the gate 10 includes "1" and "0" output ports 15 and 16 which respectively correspond to digital variables C and D.

The Boolean combinatorial function characterizing the output ports 15 and 16 are given in FIGURE 1A. In particular, a compressed air flow will appear at the "1" output port 15 (variable C) if air was present in the input port 12 (an enabled A signal) or if air was present at the input port 14 (an enabled B signal). The output port 15 thus exhibits the disjointive, or OR logic function of the two input variables A and B. Correspondingly, the "0" output port 16 has an air flow therepast if neither the A nor B signals is present.

It is observed that the input and exit air flow signal streams are characterized by a pressure somewhat reduced from that supplied by the compressed air source 100–101 to the port 11 of the gate 10, this being the case also for the other fluidic structures described hereinafter. Also, for purposes of clarity, the 3 p.s.i. power input for each fluidic structure is simply indicated by a capital "S" throughout the drawing, it being understood that these power input ports are directly connected by air passing conduits to the compressed air source 100–101.

Figure 1B:
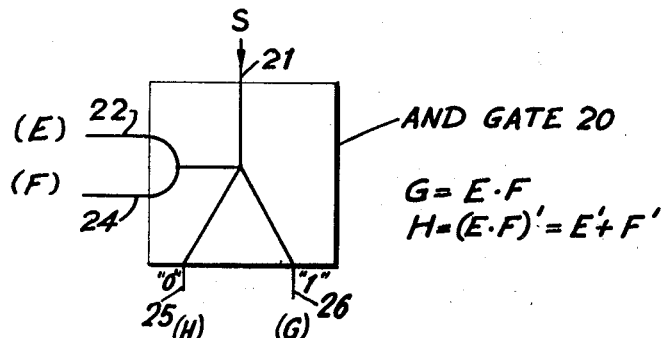

An AND logic gate 20 is illustrated in FIGURE 1B and includes a power input port 21 supplied by the compressed air source 100–101. A "1" output terminal 26 (a variable G) exhibits an output air flow if an input port 22 (E) and an input port 24 (F) are both coincidentally energized, and not otherwise (the AND Boolean function). An "0" output port 25 (a variable H) of the AND gate 20 is activated if either or both of the input ports 22 and 24 is not supplied with an input air stream.

Figure 1C:
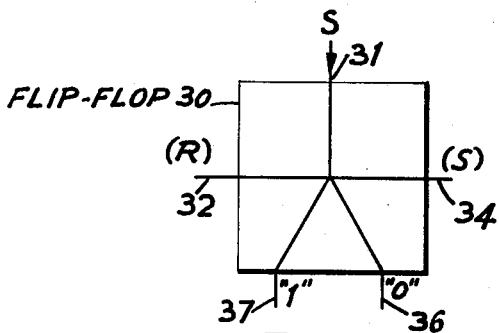

A bistable flip-flop 30 is depicted in FIGURE 1C and includes "0" and "1" output ports 36 and 37, and reset (R) and set (S) input ports 32 and 34. Compressed air from a power input port 31 will exit from the "0" output 36 or from the "1" output 37 depending upon whether the reset input port 32 or the set input port 34, respectively, was last supplied with an input signal. Moreover, such exit flow will persist until the other input port is pulsed.

Figure 1D:
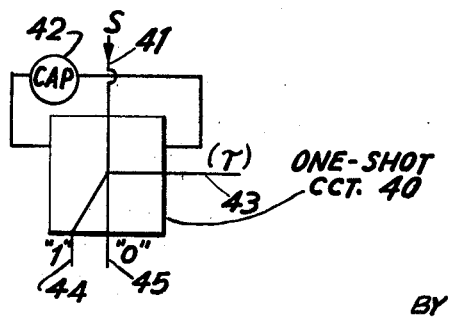

Finally, the arrangement of FIGURES 2–5 includes a one-shot gate 40 shown in FIGURE 1D. The gate 40 includes an input port 41 driven by the power source 100–101, and a "0" output 45 which quiescently passes the exit air stream. When a toggle input port 43 is pulsed with an air stream, the exit air flows switches to a "1" output port 44 for a short time interval, and then returns to the "0" output 45. The duration of the air flow at the "1" port 44 is determined by the size of a fluidic timing capacitor 42 which comprises a hollow cavity.

Specific embodiments for the above-described fluidic structures are well known in the art. For example, such structures may be purchased from the Corning Glass Works, Corning, New York.

Returning now to the arrangement of FIGURES 2–5, there is shown the apparatus associated with a single automated milking station. It is to be understood that for most applications, a plurality of such stations would be employed to batch process a dairy herd. The automated milking apparatus includes an entrance gate 99 and an exit gate 80 which are selectively operable to secure a cow within the milking station, and to permit ingress and egress of the animal. The entrance gate 99 may comprise a standard pneumatically operated structure driven by a gate actuating rod 98 connected to a piston 94. Two chambers 96 and 92 of a piston cylinder 90 are respectively disposed to the left and right of the piston 94. When air pressure is supplied from the pressure source 100–101 (indicated by the letter "S" as above discussed) to the chamber 92 via a three position transfer valve 104, and the chamber 96 is vented to the atmosphere by a similar transfer valve 102, the piston in the cylinder 90 will move to the left thereby closing the entrance gate 99. Conversely, the piston 94 will retract to the right, and the gate 99 will open, when the pressure conditions for the chambers 92 and 96 are reversed by alternate settings of the three-way transfer valves 102 and 104. The entrance gate 80 has a corresponding plurality of elements associated therewith and operates in a manner identical to that described above with respect to the entrance gate 99.

When the composite milking system resides in its quiescent state, both of the gates 80 and 99 are open, and a "milking completed" indicating lamp 264 is energized with electrical line voltage impressed on two electrical leads 281 and 283 through a conduction path which includes two switches 259 and 269. In particular, a flip-flop 124, along with other flip-flop structures included in the system of FIGS. 2–5, initially resides in a reset condition. The corresponding activated "0" output terminal thereof which passes the output air flow energizes a pressure responsive electrical transfer contact 260 in the switch 259, with the transfer member 260 thereby contacting a switch terminal 262. Correspondingly, the pressure responsive transfer switch 269 is unenergized by an OR gate 194, and a transfer member 270 therein contacts a terminal 271. With the switches 259 and 269 in the aforedescribed conditions, the "milking completed" lamp 264 is illuminated, while a "ready to milk" lamp 263 and a "milking in progress" lamp 266 are open circited and, therefore, not illuminated.

To begin a milking operation, the operator depresses a push-button 60 thereby generating an air pulse which switches a flip-flop 62 to its set state. The activated "1" output of the flip-flop 62 energizes an input of an OR gate 210 which, therefore, has an exit air stream at its "1" output, and not at its "0" output. The air flow at the "1" output of the OR gate 210 activates a pressure responsive three-way transfer valve 66. The valve 66 thus passes air pressure from the source 100–101 to a chamber 72 in an entrance gate 80 operating air cylinder 70. Also, responsive to the inert "0" output of the gate 210, a transfer valve 82 disconnects a cylinder chamber 76 to the right of a piston 74 from the air pressure source, and vents the chamber 76 to the atmosphere. These pressure conditions force the piston 74 to the right, hence closing the exit gate 80 through the action of a connecting rod 78. If the operator forgets to depress the button 60, the exit gate 80 will automatically close when a start button 130 is pushed, as described below.

After the exit gate 80 is closed, a cow is led into the milking station and the operator depresses a push button 224 to close the entrance gate 99 thereby locking the cow in the stall. The air pulse generated by the depressed button 224 momentarily switches an OR gate 226 to its "1" state, thereby setting a flip-flop 228. The resulting air flow at the "1" output of the flip-flop 228 causes the valve 104 to pressurize the piston chamber 92 while the valve 102, which detects the absence of air pressure at the "0" output of the flip-flop 228, vents the piston chamber 96. Accordingly, the piston 94 moves to the left thereby closing the entrance gate 99. The animal is thus secured within the milking station. If the operator forgets to push the button 224, the entrance gate 99 will be closed when the milking starts, as discussed below.

To put the milking system in a "ready to milk" mode, the operator depresses the start push-button 130 thereby generating an impulse which sets the flip-flop 124 directly, and also sets a flip-flop 206 acting through an OR gate 205. The enabled "1" output of the flip-flop 124 partially enables an AND gate 182 for the duration of the milking cycle, and also switches an OR gate 126 to its "1" state. The resulting energized "1" output of OR gate 126 activates a pressure responsive electrical switch 128, thereby energizing a feeder 140 via one of a plurality of timer switches 132, 133 . . . 138 selected by the operator via a rotatable multicontact transfer switch 130. In particular, the operator selects a timer setting with the switch 130 to regulate the amount of feed to be put out by the feeder 140. This depends principally upon the milk output history of the particular animal at the milking station, and also varies with such factors as the season and the age of the animal. Specific embodiments for the feeder 140 are well known and may comprise, for example, rotary screw actuated devices.

Response to the loss of air flow at the "0" output of the flip-flop 124 when the start button 130 is depressed, the pressure switch 259 returns to its relaxed position with the transfer arm 260 contacting a terminal 261. Accordingly, the "ready to milk" lamp 263 is illuminated by the power leads 281 and 283, and the previously lit "milking completed" lamp 264 goes off.

The de-energized "0" output of the flip-flop 124 also disables an AND gate 202 thereby removing the sole active input from an OR gate 204 hence deactivating the "1" output thereof. This, in turn, disables an AND gate 208 causing an air flow to exit from the "0" output thereof which switches the following OR gate 210 to its "1" state, provided the gate 210 does not already reside in its "1" state responsive to the operator having previously pushed the button 60 to close the exit gate 80. The air flow exiting from the "1" and not the "0" output of the gate 210 closes the exit gate 80 in the manner above-described, assuming the operator had not already closed this gate.

As noted above, the OR gate 204 was disabled by the inert "1" output of the AND gate 202 responsive to operation of the start button 130. Accordingly, the energized "0" and de-energized "1" output of the OR gate 204 respectively constrain two pressure responsive three-way transfer valves 124 and 126 to apply pressure from the source 100–101 to a cylinder 121 chamber 118 to the left of a piston 120, and to vent a chamber 122 to the right of the piston 120. The piston 120 is connected by an actuating rod 117 to a milker arm 110 having at one end thereof a milking claw 112 and a plurality of teat cups 114. When the piston 120 retracts to the right responsive to the above-stated pressure conditions, the arm 110 pivots about an element 116 and is rotated, as by camming action or the like, to a position beneath the cow.

Rotatable with the arm 110 but vertically separable therefrom, is a sensor 290 which includes an air pressure input orifice 292 energized by the air source 100–101, a relatively large orifice 291 disposed beneath the arm 110, and a relatively small signal output orifice 293. When the teat cups 114 are not engaging the cow, the arm 110 is in a down position and blocks the large orifice 291. For such a condition, the signal output orifice 293 is energized by the pressure input at the aperture 292. Conversely when the cups 114 are mounted on the animal, and the arm 110 is thus in a raised position, the input pressure at the aperture 292 is dissipated at the unblocked, relatively large orifice 291 and essentially no air passes through the signal aperture 293.

To effect a final system function required before milking begins, all inputs to an OR gate 220 are rendered passive when the flip-flop 124 is set by the push-button 130. Accordingly, a pressure responsive transfer valve 300 connected to the "1" output of the OR gate 220 is adapted to vent source pressure S to the atmosphere, and to de-energize the piston 303 of a pinch valve 302. A constricting member 304 connected to the piston 303 thus unblocks a flexible milk line 150 to provide the necessary milking vacuum.

In accordance with common milking practice, a pulsating vacuum is applied to pneumatic tubes in the teat cups 114 through a passage in the milking claw 112 through a line 304, while milk flows through separate passages in the cups 114 and the claw 112 into the milking line 150 also under vacuum. The connections for the milking line 150 and the pulsating vacuum line 304 to the vacuum line 302 are well known to those skilled in the art and are not shown in the drawing for purposes of clarity.

Finally, a printer 244 is included in the system of FIGS. 2–5, and is supplied with information identifying the particular animal at the milking station by way of a push-button console 246 which is operated by the attendant when the cow enters the milking station. The printer 244 is adapted to output printed information, on a card, tape, or other medium, which identifies the specific animal, the quantity of milk extracted from her measured in the manner below described, and the elapsed milking period.

To initiate milking, the operator notes the illuminated "ready to milk" lamp 263, and applies the teat cups 114 to the cow, thus raising the milker arm 110 above the sensor 290. The cups 114 are held in place under vacuum action. Milk is taken from the animal under action of the pulsating vacuum about the cups 114, and flows under vacuum through the cups 114, the claw 112 and the milk line 150 (shown broken in FIGURES 2, 3 and 5) into a milk meter 151. The meter 151 includes tilt table apparatus described in detail in N. J. Daysh Patent 1,546,437 issued July 21, 1925, and essentially comprises a reciprocating table 152 including two milk receiving chambers 153 and 154 having a separating wall 155 therebetween. Milk flows from the milk line 150 and is diverted by one side of the separating wall 155 into one of the chambers, for example, the chamber 153. When this chamber 153 fills sufficiently, the composite tilt table 152 rotates to the right about a pivot 163 until the bottom of the chamber 153 engages a stop 165a. The milk contained in the chamber 153 flows therefrom under vacuum onto the bottom of the meter 151 and then into a milk line continuation 150a to a receiving tank (not shown). After such rotation, the alternate side of the separating wall 155 diverts incoming milk from the line 150 into the chamber 154 and, after sufficient milk has been collected, the table 152 pivots counterclockwise and the chamber 154 empties into the milk line 150a. The above-described functioning of the meter 151 continues in a reciprocating manner as long as milk is forthcoming from the line 150.

Two sensors 160 and 168 are associated with the milk meter 151 and respectively include air pressure input orifices 161 and 170, relatively large apertures 162 and 174, and signal output orifices 164 and 172. Connected to the tilt table 152 pivot 164 is a flapper 173 which is adapted to selectively block the large apertures 162 and 174 of the sensors 160 and 168 when the chambers 153 and 154 have respectively last been filled, and are resting on their respective stops 165a and 165b. When the table 152 tilts, the flapper 173 also rotates to close the alternate aperture 162 or 174. The sensors 160 and 168 and the flapper 173 are mounted outside the meter 151, with the pivot rod 164 protruding through the side of the meter 151 to operate the flapper.

When either of the orifices 162 or 174 of the sensors 160 and 168 is closed, air flows out of the corresponding signal aperture 164 or 172 and energizes an OR gate 180, thus activating the "1" outpput terminal thereof. However, as the flapper 173 translates between sensors, the large apertures 162 and 174 thereof are simultaneously uncovered and there is no input to the gate 180. Accordingly, during such transition times, the "0" output of the gate 180 is energized, thus giving rise to a train of pressure pulses thereat, as indicated by the waveforms 181 in FIG. 2.

Each air pulse at the "0" output terminal of the gate 180 fully enables the AND gate 182, with the other input thereof being continously activated by the set flip-flop 124. Accordingly, the pulses 181 produce a corresponding pulse train 183 at the output of AND gate 182. The first pulse in the train 183 sets a flip-flop 320. The air flow at the "1" output of the flip-flop 320 closes the entrance gate 99 acting through the OR gate 226 and the flip-flop 228 if the operator forgot to close the gate 99 by pushing the button 224.

For the duration of each air pulse at the "1" output of the gate 182 represents a quantity of milk given by the and connects the output of a pressure regulator 184 to a fluidic capacitor 190 through a check valve 188. Air is thus supplied to, and stored at such times in the capacitor 190 which comprises a hollow chamber.

Between consecutive pulses, the capacitor 190 discharges through an adjustable orifice 192 and into an input of on OR gate 194. As long as air is so discharging, the OR gate 194 emits air from its "1" output rather than from its "0" output terminal. The rate of discharge of the capacitor 190 is adjusted such that the air storing capacitor will not fully empty between consecutive pulses supplied by the AND gate 182, the valve 186, and the regulator 184, provided such pulses occur within a maximum acceptable time spacing. This, in turn, requires that milk is derived from the cow at a rate which will cause the milk meter tilt table 152 to reciprocate at a sufficient frequency to keep the capacitor 190 from fully discharging.

Each pulse in the pulse train 183 at the "1" output of the gate 182 represents a quantity of milk given by the capacity of a tilt table chamber 153 and 154. The pulses 183 are supplied to a counter included in the printer 244 which accumulates and stores the total number of pulses associated with the milking of any particular cow, thereby also storing a direct measure of the milk given by her. In addition, the energized "1" output of the OR gate 194, indicative of milk flowing through the meter 151, is supplied to one input of an AND gate 200, and also supplied to the printer 244 to activate a timer included therein such that information identifying the elapsed milking time can be generated by the printer 244.

The OR gate 194 remains switched to its "1" state as long as the capacitor 190 does not become fully discharged. The transfer member 270 of the pressure responsive switch 269 responds to the energized "1" output of the gate 194 by contacting the terminal 272. Accordingly, the "milking progress" indicating lamp 266 is connected directly across the power leads 281 and 283 and is thus illuminated. Furthermore, the "ready to milk" lamp 263 becomes open circuited, and is therefore extinguished.

The automated milking system of FIGS. 2 through 5 continues to function in the above manner, with the interval between consecutive rotations of the reciprocating table 152 becoming increasingly longer as the milk supply of the cow diminishes. Eventually, when the milk supply approaches exhaustion, the capacitor 190 fully discharges because of the relatively long time interval between consecutive translations of the flapper 173. When this occurs, there is no input to the OR gate 194 which automatically reverts to its quiescent "0" state. Accordingly, the air stream exits from the "0" output thereof to a one-shot gate 306 which generates a single pulse at the "1" output there of to indicate that the milking is completed. This pulse resets the flip-flop 124, and the energized "0" flip-flop terminal activates the switch 259. The "milking completed" lamp 264 is thus illuminated. Coincidentally therewith, the "milking in progress" lamp 266 is de-energized as the switch 269 transfer member 270 again contacts the terminal 271 responsive to the passive "1" output of the OR gate 194.

In addition, the pulse output of the one-shot gate 306 switches an OR gate 254 via a fully enabled AND gate 252 to transmit a command input signal to the printer 244. The printer 244 is adapted upon receiving such a pulse to print the identity of the particular animal at the station determined from the console 246, the milk output of the animal as identified by the contents of the counter included therein, and the elapsed milking time. After the printing is completed, the printer 244 is automatically cleared to await the next milking operation. In addition, the pulse from the one-shot gate 306 resets the flip-flop 62.

With the above conditions obtaining, both inputs to the OR gate 126 are passive and the pressure responsive switch 128 opens. The feeder 140 is thus isolated from electrical power and no additional feed is supplied to the animal. The operative timer 132, 133, . . . , or 138 is adapted to continue timing until its initial state is regained to be ready when selected for a succeeding milking operation. The de-energized "1" output of the flip-flop 124 also disables the AND gate 182 thereby blocking any output which may be generated by the gate 180 from reactivating the capacitor 190 via the valve 186.

The enabled "0" output of the flip-flop 124 energizes the OR gate 220 thus supplying an output air flow to its "1" terminal. This causes the valve 300 to actuate the pinch valve 302, driving the members 303 and 304 to the right and cutting off the vacuum and milk flow in the milk line 150. With the vacuum thus removed, the teat cups 114 and the milker arm 110 drop off the cow and block the large aperture 291 of the sensor 290. The resulting signal from the aperture 293 of the sensor 290 resets the flip-flop 320 to its "0" state thereby also switching the AND gate 202 and the OR gate 204 to their "1" states. The air flow at the "1" output of the gate 204 activates the pressure responsive valve 126 to apply pressure to the chamber 122 to the right of the piston 120 in the milker arm activating cylinder 121, while the inactivated valve 124 vents the left chamber 118. Accordingly, the piston 120 extends to the left and the rod 117 rotates the arm 110 out from beneath the animal to a rest position at the side of the milking station.

The "1" output of the OR gate 204 also switches the AND gate 208 to its "1" state, thereby relaxing the OR gate 210 to its "0" condition. The energized "0" output of the gate 210 resets the flip-flop 228 which operates in conjunction with the valves 102 and 104 to move the piston 94 to the right, thereby opening the entrance gate 99. Similarly, the exit gate 80 opens responsive to air exiting from the "0" and not the "1" output of the gate 210.

Thus, in accordance with the above mode of system functioning, the arrangement of FIGS. 2–5 automatically detects the completion of milking. Responsive thereto, a printed record is made; the system is reset to its initial state ready to begin a new milking operation; and the milker arm 110 and the entrance and exit gates 99 and 80 are positioned to let the milked animal out of the milking station and a new animal in for processing.

However, the situation is sometimes encountered where the teat cups 114 inadvertently fall off the animal during the course of milking. When this occurs the milker arm 110 falls, and covers the orifice 291 of the sensor 290. The resulting signal at the sensor orifice 293 resets the flip-flop 320 to its "0" state. Accordingly, the AND gate 200 is fully enabled and switches the OR gate 204 to its "1" state and, in the manner discussed above, the enabled gate 204 rotates the separated milker arm 110 from beneath the animal.

The enabled AND gate 200 also resets the flip-flop 206 thus disabling the AND gate 208 to prevent the logic gate 210 from opening the entrance and exit gates 99 and 80. The operator waits until the capacitor 190 fully discharges and the "milking completed" lamp 264 is illuminated responsive to the above-discussed action of the one-shot gate 306 and the then reset flip-flop 124. He then decides whether or not it is worthwhile to resume milking. If milking is to be continued, the attendant pushes the start button 130, and the composite milking system attains its "ready to milk" state. The cups 114 are replaced on the animal and milking resumes as before. If the operator opts against further milking, he depresses a printer actuating push-button 240. This switches the OR gate 254, thereby supplying a print command to the printer 244 which outputs all appropriate information. The output from the depressed button 240 also acts through the elements 205, 206, 208, 210 and 228 to open the gates 80 and 99.

The activated "0" output of the flip-flop 206 obtaining when this flip-flop is reset by the gate 200 after the arm 110 accidentally disengages, maintains the OR gate 126 in its "1" state. Thus, the feeder 140 is continuously connected to electrical power by the switch 128, and the selected timer measures time from the first operation of the start button 130. Thus, the proper amount of feed is continuously supplied to the animal and, moreover, overfeeding is prevented since additional feed is not put out by the feeder 140 should the start button 130 be reactivated after the milker arm 110 has accidentally fallen from the animal.

Thus, the automated milking system of FIGS. 2 through 5 includes apparatus for automatically responding to a premature dropping of the milker arm 110, and for remounting the arm 110 for further milking at the discretion of the operator. Also for such an occurrence, a proper quantity of feed is automatically supplied to the animal.

It is to be understood that the above-described arrangement is only illustrative of the principles of the present invention. Numerous modifications and adaptations thereof may be made by those skilled in the art without departing from the spirit and scope thereof. For example, a small orifice and a serially connected capacitor chamber may be interposed in an interelement conduit to obviate any logical race condition which may develop in a fluidic milking system. Also, the fluidic logic apparatus, storage elements, and the like may be replaced by their equivalent electrical counterparts. Care must be taken, however, to protect all metallic electrical conductors from the strong ammonia vapors found in dairy barns, a problem not associated with the above-described fluidic structure.

Further, one pair of entrance and exit gates may be utilized on a per installation, rather than a per station basis, to selectively enclose all the milking stations in unison. For such an arrangement, multiple input AND logic would be employed to operate the gates when "ready" signals are received from all milking stations.

What is claimed is:

1. In combination in a milking system, milking means including a set of teat cups, means for initiating milking by said milking means, a milk meter connected to said teat cups, said meter including means for reciprocating at a rate depending upon the rate of milk flow through said teat cups, and means operatively connected to said reciprocating means responsive to said reciprocating means reciprocating at less than a threshold rate for terminating milking by said milking means.

2. A combination as in claim 1 wherein said reciprocating means includes a pivoted tilt table having two contiguous chambers and a separating wall therebetween for alternatively diverting milk from said teat cups into said chambers.

3. A combination as in claim 1 wherein said milking terminating means includes storage means, means for continuously discharging said storage means, means responsive to a predetermined status of said reciprocating means for energizing said storage means, and means responsive to said storage means being discharged for terminating milking by said milking means.

4. In combination in an automated milking system, milking apparatus including a plurality of test cups, gated milk metering means for generating an output signal responsive to a milk flow through said teat cups falling below a predetermined minimum rate, milking initiating means for activating said milking apparatus, bistable means set by said milking initiating means for enabling said gated metering means, said bistable means being reset responsive to an output signal from said gated metering means, and means for disabling said gated metering means responsive to said bistable means being reset.

5. A combination as in claim 4 wherein said gated metering means includes a reciprocating tilt table connected to said teat cups, means for sensing the rate of reciprocation of said tilt table, and means for generating an output signal when said rate sensing means detects a tilt table reciprocating rate less than a predetermined threshold rate.

6. A combination as in claim 5 wherein said sensing and output generating means comprises means responsive to said tilt table residing in a particular orientation for generating an output pulse, a power source, a storage element, means responsive to an output pulse from said tilt table orientation responsive means for connecting said power source and said storage element, and discharge means connected to said storage element.

7. A combination as in claim 4 further comprising output and entrance gates, first manually operated means, first logic means for closing said exit gate responsive to a signal from first manually operated means, second manually operated means, and second logic means for closing said entrance gate responsive to a signal from said second manually operated means.

8. A combination as in claim 7 further comprising first OR logic means responsive to said bistable means residing in a set state or to a signal from said first logic means for closing said exit gate, and second OR logic means responsive to a signal from said second logic means or to said bistable means residing in set state for operating said exit gate.

9. A combination as in claim 6 further comprising printing means including a counter for storing the number of pulses generated by said tilt table orientation responsive means, and printing means for outputting the contents of said counter responsive to an output generated by said gated milk metering means.

10. A combination as in claim 4 further comprising feeder means activated responsive to said bistable means residing in a set state.

11. A combination as in claim 4 further comprising a rotatable milker arm having said teat cups mounted thereon, means for selectively rotating said milking arm between an operating position and a rest position responsive to said bistable means respectively residing in a set or a reset state.

12. A combination as in claim 11 wherein said rotatable milker arm is adapted to reside in a raised position during a milking operation, and further comprising entrance and exit gates, and logic means for closing said entrance and exit gates when said bistable means resides in said set state, sensing means for providing an output signal when said milker arm resides in a relatively low position, additional logic means selectively responsive to a signal from said milker arm sensing means for inhibiting said entrance and exit gate operating logic means, feeder means, and OR logic means for energizing said feeder means responsive to an output from said arm sensing means or to said bistable means residing in said set state.

13. A combination as in claim 12 further comprising a vacuum line connected to said teat cups, valve means for selectively unblocking said vacuum line, and means responsive to said bistable means residing in said set state for operating said valve means to unblock said vacuum line.

14. In combination in a milking system, milking means, means for initiating milking by said milking means, milk metering means including a reciprocating tilt table having two contiguous chambers and a flapper member connected to said table, a source of compressed air, a fluidic capacitor, a pressure responsive valve for selectively connecting said compressed air source with said capacitor, air discharging means connected to said capacitor, sensing means selectively contacted by said flapper member for selectively pulsing said pressure responsive valve, and means responsive to said capacitor being fully discharged through said discharge means for terminating milking by said milking means.

15. A combination as in claim 14 wherein said sensing means comprises two sensing elements each having an air pressure input orifice, a signal exit orifice and a relatively large pressure dissipating orifice, said pressure dissipating orifices being so mounted relative to said flapper means as to become selectively blocked by said flapper means, and logic means responsive to the absence of an air flow at said signal orifice of either of said sensing means for pulsing said pressure responsive valve.

16. A combination as in claim 15 wherein said milking terminating means comprises bistable means set by said milking initiating means, first additional logic means interposed between said valve pulsing means and said pulse responsive valve, second additional logic means having an input thereon connected to said bistable means and being responsive to said bistable means residing in a set state for passing pulses generated by said valve pulsing logic means to said pulse responsive valve, and pulse generating means responsive to said fluidic capacitor being fully discharged for resetting said bistable means.

17. A combination as in claim 14 further comprising a check valve disposed intermediate said pulse responsive valve and said fluidic capacitor.

18. A combination as in claim 14 further including printer means including a counter selectively cycled by pulses generated by said valve pulsing means, and printing means operative responsive to said capacitor being fully discharged.

19. In combination in an arrangement for signaling completion of a milking operation, milking means including a set of teat cups, a milk meter connected to said teat cups, said meter including means for reciprocating at a rate depending upon the rate of milk flow through said teat cups, signaling means for indicating the completion of milking, and means operatively connected to said reciprocating means and responsive to said reciprocating means reciprocating at less than a threshold rate for enabling said signaling means.

20. A combination as in claim 19 wherein said reciprocating means includes a pivoted tilt table having two contiguous chambers and a separating wall therebetween for alternatively diverting milk from said teat cups into said chambers.

21. A combination as in claim 19 wherein said signal enabling means includes storage means, means for continuously discharging said storage means, means responsive to a predetermined status of said reciprocating means for energizing said storage means, and means responsive to said storage means being discharged for enabling said signaling means.

References Cited

UNITED STATES PATENTS

| | | | |
|---|---|---|---|
| 3,115,116 | 12/1963 | Schilling et al. | 119—14.08 |
| 3,373,761 | 3/1968 | Flocchini | 137—205 |

ALDRICH F. MEDBERY, Primary Examiner

U.S. Cl. X.R.

119—14.02

PO-1050
(5/69)

UNITED STATES PATENT OFFICE
CERTIFICATE OF CORRECTION

Patent No. 3,499,422  Dated March 10, 1970

Inventor(s) Kurt Nelson

It is certified that error appears in the above-identified patent and that said Letters Patent are hereby corrected as shown below:

Column 3, line 38, "flows" should be --flow--.

Column 4, line 18, "aited" should be --cuited--.

Column 6, line 46, "outpput" should be --output--.

Column 6, line 65, delete "represents a quantity of milk given by the" and insert --a pressure responsive valve 186 opens--.

Column 9, line 53 (claim 4), "test" should be --teat--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents